Nov. 29, 1927.
L. ROUANET
1,650,853
PROCESS OF MANUFACTURING CAGES FOR BALL OR ROLLER BEARINGS
Filed Nov. 11, 1924
Fig. 1
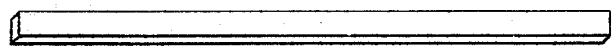
Fig. 2    Fig. 3
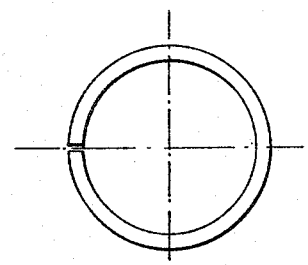 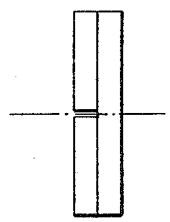
Fig. 4
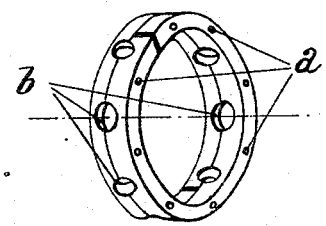
Inventor
L. Rouanet
By Marks & Clerk Patented Nov. 29, 1927.

1,650,853

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

PROCESS OF MANUFACTURING CAGES FOR BALL OR ROLLER BEARINGS.

Application filed November 11, 1924, Serial No. 749,351, and in France November 22, 1923.

The present invention relates to a manufacturing process of guide members for ball or roller bearings.

The main object of the invention is to provide a manufacturing process enabling guide members to be economically obtained from the triple point of view of material, labor and tools.

To this effect strips or bands of predetermined length are taken from any suitable material and rolled up in the form of rings in which there is afterwards formed radially extending housings for the balls or rollers and transversely extending bores for their assembly.

The accompanying drawing shows, by way of example, the successive steps of manufacturing a ball cage according to the process of the invention.

In this drawing:

Fig. 1 is a perspective view of the strip or bar, suitable to form a ring;

Fig. 2 is a side view of a formed ring;

Fig. 3 is a front elevation of a pair of coupled rings, in proper relative position for the drilling operation;

Fig. 4 is a perspective view of a ball cage according to the invention.

Small strips (Figure 1) of suitable section and length, for example of brass, iron or steel, etc., are rolled up and expanded so as to form rings (Fig. 2). The rings thus formed are coupled by pairs, (Fig. 3), their respective joints angularly displaced of the desired quantity and holes $a$ extending transversely through the two rings are bored or drilled (Fig. 4).

The said lateral holes are first used to temporarily maintain the two conjugate rings in suitable relative position during the boring of the radial holes $b$ (Fig. 4) which will serve as housings for the balls of a ball bearing. The holes $a$ are afterwards used, when mounting the said ball bearing, for the final coupling of the two rings, or conjugate halves of the cage.

It will be understood that the joint between the two ends of the strip forming each of the rings may be welded or brazed together before the boring out of the radial holes.

Claims:

1. A process for forming guide members for ball or roller bearings which comprises rolling bars of predetermined length and section into ring form, so as to form rings capable of being expanded, temporarily holding said rings in pairs in suitable relative position and drilling radial straight sided holes in the two rings to serve as housings for said balls, rollers and the like bearings.

2. A manufacturing process according to claim 1, characterized by the fact that the joint between the ends of the strip forming each ring is welded.

3. A manufacturing process according to claim 1, characterized by the fact that the rings are definitely assembled together, by pairs, with the openings in adjacent position, in order to form cages for the ball or roller bearings.

LOUIS ROUANET.